July 19, 1966  H. V. HENDERSON  3,261,304
DRIVES FOR OVERHEAD HAULAGE VEHICLES
Filed July 6, 1965  2 Sheets-Sheet 1

Inventor
Herbert Victor Henderson
By Shoemaker and Mattare
Attys.

July 19, 1966  H. V. HENDERSON  3,261,304
DRIVES FOR OVERHEAD HAULAGE VEHICLES
Filed July 6, 1965  2 Sheets-Sheet 2
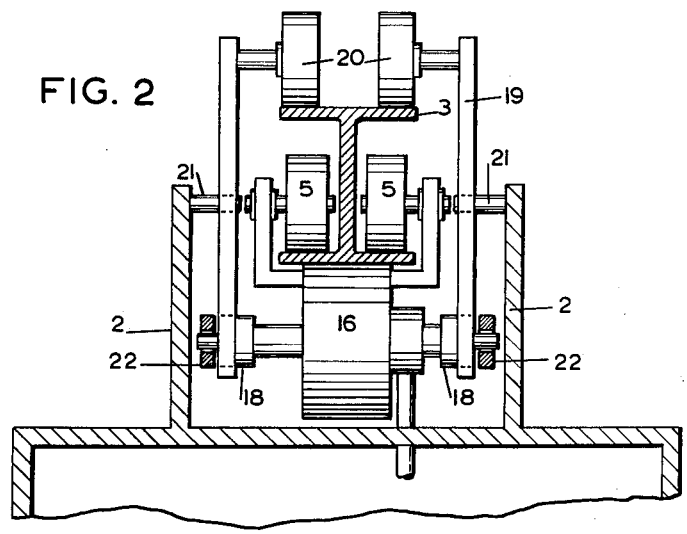
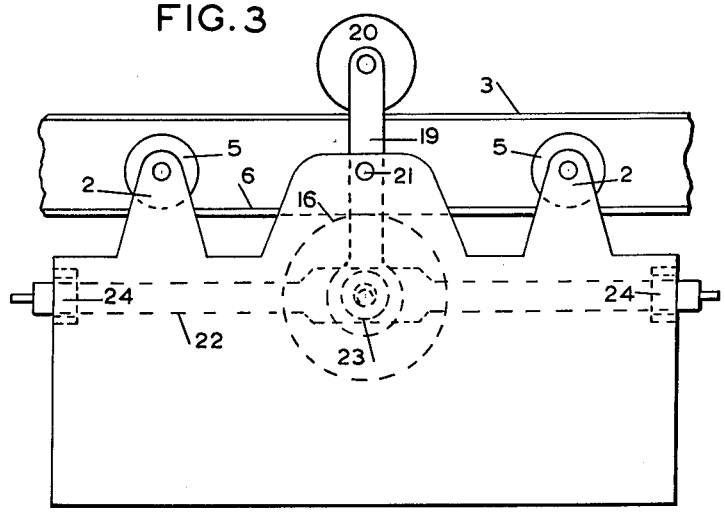
INVENTOR
HERBERT VICTOR HENDERSON
By Shoemaker and Mattare
Attys.

United States Patent Office 3,261,304
Patented July 19, 1966

3,261,304
DRIVES FOR OVERHEAD HAULAGE VEHICLES
Herbert V. Henderson, Germiston, Transvaal, Republic of South Africa, assignor to Anglo-Transvaal Consolidated Investment Company Limited, Transvaal, Republic of South Africa
Filed July 6, 1965, Ser. No. 469,797
Claims priority, application Republic of South Africa, July 10, 1964, 64/3,272
3 Claims. (Cl. 105—73)

This invention relates to drives for overhead haulage vehicles and more particularly to locomotives coupled to propel one or more carriages or tubs with the train suspended from an overhead track.

It will be appreciated that it is desirable to drive locomotives such as those above referred to with sufficient adhesion between the driving wheels and rails to propel the load at a given time and under the particular existing circumstances without slippage between drive wheels and rails while at the same time not applying unnecessarily large pressures to the drive wheels.

The object of the present invention is to provide a drive arrangement for such vehicles wherein the pressure applied by the drive wheels to the rails will vary automatically with the load to be moved.

According to this invention there is provided a locomotive adapted to be driven on an overhead track said locomotive comprising a rigid frame, wheels carried by the frame adapted to engage the upper and lower surfaces of the track, at least one of said wheels being a driven wheel, a swingeable link supporting said driven wheel pivotally secured to the frame on a line extending in a direction from the axis of the wheel towards the track and a draw-bar longitudinally movable with respect to the frame also connected to the swingeable link at a distance from the pivot point of the link.

Further features of this invention provide for the link to extend on either side of the track and to have wheels, both of which may be driven, on each end thereof but with the draw-bar connected towards one end of the link only.

A preferred embodiment of this invention will be described with reference to the accompanying drawings in which:

FIGS. 2 and 3 are diagrammatic representations illustrating the operation of this invention.

Figure 1:
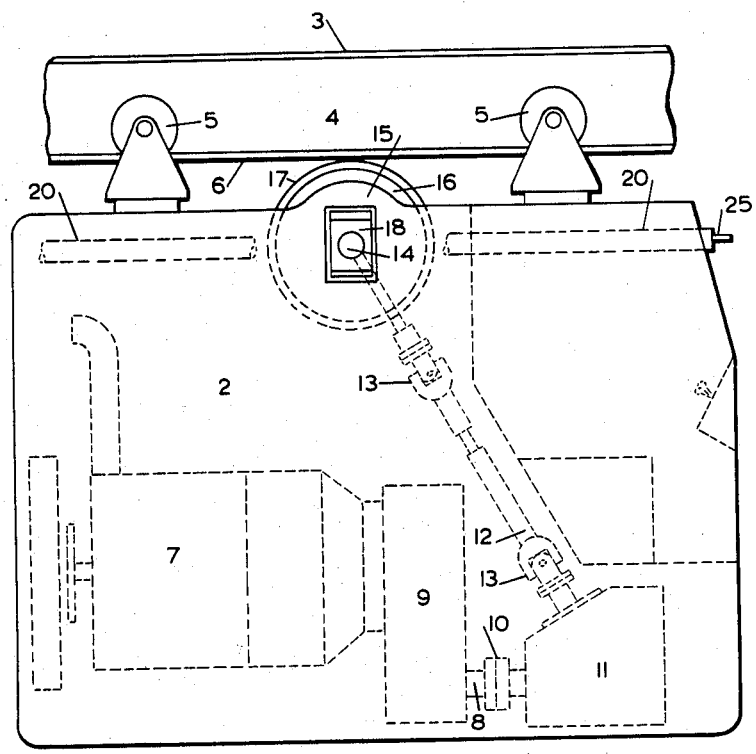
FIG. 1 is a general diagrammatic view of a locomotive.

It will be appreciated that the monorail locomotive illustrated in FIG. 1 is only one form of locomotive suitable for use with the present invention. Other constructions may be used provided either the drive or running wheels and the draw-bar are supported by but movable relative to the locomotive frame in the manner set forth above.

Briefly then with regard to FIG. 1 a practical form of locomotive 1 comprises a rigid frame 2 suspended from a track 3 which may conveniently be in the form of an I beam 4. The frame 2 is supported from two pairs of running wheels 5 which wheels are rotatably mounted on axles located towards the ends of the frame which axles will preferably be secured to the frame 2 in any convenient manner in swivel mountings which ensures that no longitudinal or vertical displacement of these wheels 5 relative to the frame 2 can take place.

As shown the wheels 5 run on the upper surfaces of the lower flanges 6 of I beam 4.

The frame 2 also houses the prime mover for the locomotive which may be a diesel engine 7 illustrated by the dotted lines representation and the drive 8 from this engine is connected either directly or through a torque converter 9 by a coupling 10 to a suitable reduction gearing unit 11. The output from the unit 11 is connected by means of an extensible drive shaft 12 and universal joints 13 to the shaft 14 of a single drive wheel assembly 15.

The assembly 15 is mounted in the frame 2 so that drive wheel 16 engages the undersurface of flanges 6 of I beam 4. The wheel 16 is preferably provided with a resilient tyre 17 made of material which will promote frictional engagement between wheel 16 and flange 6.

The drive wheel 16 is located in a central position relative to the running wheels 5 and the axle therefor is supported in bearing blocks 18.

The locomotive frame 2 also embodies an operator's cab with the necessary controls for operation of the locomotive.

Spring means (not illustrated) may be incorporated in the assembly to ensure that a certain minimum pressure is applied to the wheel supports to ensure engagement between tyre 17 and the track surface.

The lowest position of the drive wheel 16 is made to afford sufficient adhesion to drive at least the locomotive on its own without any load such as a train of carriages or tubs.

The mechanism of the invention will now be described with particular reference to FIGS. 2 and 3 of the accompanying drawings.

A swingeable link 19, is pivotally mounted on the frame 2 substantially central between the free running wheels 5 and extends vertically above and below the track 3. Each end of this link 19 supports a wheel and at least the lower wheel is the drive wheel 16 and is driven from the motor 7. However the wheels 16 and 20 may be connected together to be driven in unison with the upper wheel 20 running on a surface of the track 3 the same distance from the pivot mounting 21 for the link 19 as the undersurface of the track 3 on which the lower wheel 16 operates.

A draw-bar 22 is mounted to have a limited amount of longitudinal movement relative to the body of the locomotive 1 and this draw-bar 22 is attached to the swingeable link 19 at or adjacent the mounting 23 for the lower wheel 16 in a manner which will enable the link 19 to swing a limited amount with longitudinal movement of the draw-bar 22 relative to the frame 2. The draw-bar 22 will be constrained by guides 24 as illustrated.

In use with the draw-bar 22 coupled to a train of carriages or tubs and as the locomotive 1 is driven in either direction the draw-bar 22 is held back against this movement by the load. This causes the swingeable link 19 to swing about its pivot mounting 21 to press the wheels 16 and 20 carried on its ends into tighter engagement with the respective track surfaces on which these wheels run. The pressure caused by the load is dependent on the vertical distance from the pivot point of the swingeable link 19 to the point on the link 19 to which the draw-bar 22 is attached.

Means will preferably be provided to limit the movement of the link 19, and consequently the maximum pressure between the wheels and the track and it will be understood that links 19 will be provided as shown on either side of the wheels 16 and 20. The draw-bar 22 will be bifurcated along its central portion to engage both links but will have single end parts 25 for coupling to the train of carriages or tubs.

What I claim as new and desire to secure by Letters Patent is:

1. A locomotive adapted to be suspended from an overhead track, said locomotive comprising a rigid frame, two pairs of free running wheels carried by the frame and located towards the longitudinal ends thereof, a driven wheel positioned to engage an opposite surface of said track to that engaged by the running wheels, a pair of swingable links supporting said driven wheel centrally between the free running wheels and a further wheel located to engage an opposite surface of the track to that engageable by the driven wheel, said swingeable links positioned one on each side of the plane of rotation of the driven wheel and pivotally secured to the frame at a point on a line joining the axes of the wheels on the links, and a bifurcated draw-bar longitudinally movable with respect to the frame and also connected to the links at distances from the pivot points of the links.

2. A locomotive as claimed in claim 1 in which the locomotive is suspendable from the free running wheels with the driven wheel positioned to contact the undersurface of said track.

3. A locomotive as claimed in claim 1, in which the said bifurcated draw bar is connected to the supporting links.

References Cited by the Examiner
UNITED STATES PATENTS 2,063,471  12/1936  Stedfeld _____ 74—330
3,176,628   4/1965  Reid _____ 105—73

FOREIGN PATENTS 239,422  6/1910  Germany.
550,771  4/1932  Germany.

ARTHUR L. LA POINT, *Primary Examiner.*

B. S. FAUST, D. E. HOFFMAN, *Assistant Examiners.*